UNITED STATES PATENT OFFICE.

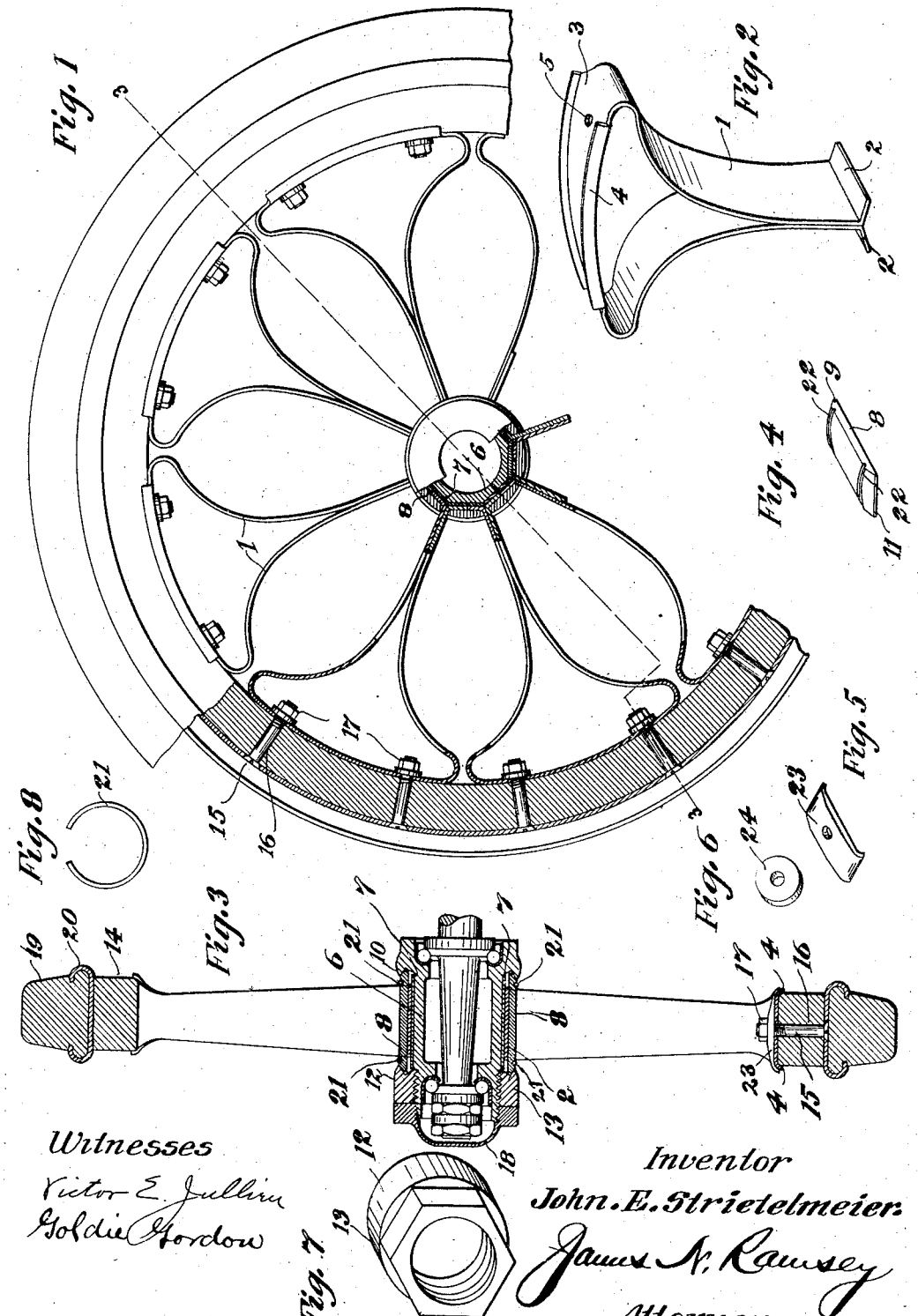

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

WHEEL.

1,059,009.     Specification of Letters Patent.     Patented Apr. 15, 1913.

Application filed November 10, 1911. Serial No. 659,638.

*To all whom it may concern:*

Be it known that I, JOHN E. STRIETELMEIER, a citizen of the United States, residing at Cincinnati, in the county of Hamilton, and State of Ohio, have invented certain new and useful Improvements in Wheels, of which the following is a specification.

My invention relates to improvements in the construction of wheels provided with spring spokes which are adapted for various uses, and more particularly for use upon automobiles and other similar conveyances, for the purpose of dispensing with pneumatic tires.

The object of my invention is to provide a wheel of this character which combines strength and lightness, compactness and neatness, efficiency and durability, speed and ease in assembling, simplicity and economy in construction, as well as a wheel so constructed and arranged as not to be liable to rattle or to require attention when in use.

Other objects and advantages of my invention will be apparent, and still others will be hereinafter presented.

My invention contemplates among other things a wheel embodying a series of unitary spring spokes, each curved into a funnel-like shape, to bring its two ends into proximity at the hub, and having its portions progressively flaring from the hub to the periphery of the rim, and locked to the latter by longitudinal integral side flanges.

My invention also consists in the means for fastening said spring spoke to the hub and to the rim respectively.

My invention also consists in the parts and in the peculiar combination and arrangement of parts as herein set forth and claimed.

In the drawing, which serves to illustrate the construction, application and use of my invention as applied to a wheel: Figure 1 is a view showing part of the wheel in elevation and part in section; Fig. 2 is a perspective view of my spring spoke; Fig. 3 is a section on the line 3—3 of Fig. 1; Fig. 4 is a perspective view of a wedge clamping member adapted to secure the inner end of the spokes to the hub; Fig. 5 is a perspective view of a washer adapted to rest upon the elongated end of the spring spoke beneath the nut; Fig. 6 is a modified form of the washer; Fig. 7 is a perspective view of the clutch which is adapted to secure the wedge clamping member in firm position upon the inner ends of the spring spokes; and Fig. 8 is a split ring adapted to hold the clamping members in place while the clutch is loosened.

In the embodiment of my invention, as illustrated, and which shows a preferred construction, 1 represents one of my novel spring spokes which is preferably made of flat spring steel and is formed substantially triangular in shape, as shown in Fig. 2, in which it is seen that its middle portion 3 is curved outwardly to conform to the inner surface of the rim of the wheel against which it abuts and is curved near its edges to engage the sides of said rim and that the two remaining portions of said spokes are curved inwardly and adapted to meet and rest against each other a portion of their length, each portion having a flange 2 extending away from each other in opposite directions at an angle to said spoke and adapted to conform to and rest upon the hub.

In order to provide a neat and compact construction which is easy to assemble accurately and which prevents any shifting or slipping of the hub relatively to the spokes, I form the outer surface of said hub 6 polygonal, substantially as shown.

The hub 6 of the wheel may be provided with a fiber collar 7 fitting closely thereon against which the flanges 2 of the springs 1 abut. I provide wedge clamping members 8 which are formed of elongated plates each adapted to conform to the shape of the flanges 2 upon its inner surface and curved upon its outer surface with a groove 22 extending transversely at each end and tapering to form a wedge 9 at one end and a wedge 11 at the other end. I also provide split rings 21 which are adapted to fit into said grooves 22 to hold said members 8 in position during the further assembling of the wheel and also to permit the wheel to be readily removed from the hub without disengaging the wedge clamping members 8.

Near the inner end of the hub 6 I provide an inwardly projecting tapering annular clamping flange 10, as clearly shown in Fig. 3. I also provide a clutch 13 having a tapering edge 12, said clutch being adapted to be screwed upon the outer end of the hub 6 and being provided with a polygonal exterior surface for the purpose of screwing and unscrewing so that when the wedge end 9 of each clamping member 8 is brought into engagement with the flange 10 and the tapering edge 12 of the clutch 13 is screwed over the wedge end 11 of each clamping member 8 the inner ends of the spokes 1 will be securely clamped to the hub 6.

The rim of the wheel is provided with a wood felly 14, to which I secure the outer enlarged ends of my spring spokes, by means of bolts 15 passing through holes 16 in the wood felly and through holes 5 in the transverse member 3 of the spoke, to which it is firmly secured by means of nuts 17.

It will be seen that the enlarged end of each spring spoke bears over nearly the entire surface of the wooden felly from spoke to spoke, thereby securing a large bearing surface between the felly and the spring spoke, and obtaining a secure fastening of the parts together, thereby preventing any settling of the spring into the wood, and by means of the flanges 4, greatly strengthening the wheel against side thrusts. By this construction it will be noted that the hub flanges 2 of each spring spoke abut the flanges 2 of the adjacent spring spoke, and that these flanges form a continuous and complete bearing extending entirely over the fiber collar 7, so that when the wedge clamping members 8 are brought into position upon the flanges 2, and the clutch 13 is screwed tightly thereon, the spring spokes are all firmly clamped in proper position upon the hub at a single operation. The springs are thus pressed against fiber instead of metal, preventing the wearing of the metal and doing away with the possibility of rattling. It also gives a better seat to overcome any inequalities in the surface of the metal.

The manner of assembling my wheel is substantially as follows: Place each spring spoke in the position shown in Fig. 1 and secure it to the rim by means of bolts 15 and nuts 17, placing either an elongated washer 23, as shown in Fig. 5, or a round washer 24, as shown in Fig. 6, between the nut 17 and spring spoke 1. I then place one of said split rings 21 upon each side of the central portion of the wheel and insert the wedge clamping members 8 between said rings and the flanged ends of said spring spokes one at a time until all of said clamping members have been placed in position, said split rings fitting into the grooves 22 of said clamping members, thus holding the clamping members in position while the wheel is being assembled.

When the fiber collar 7 is used it is placed in position upon the hub 6, as shown in Figs. 1 and 3. I then place these assembled parts upon the hub 6 until one tapering end of each clamping member 8 engages the annular flange 10. I next screw the clutch 13 having a tapering edge 12 upon the other tapering ends of said clamping members 8 until said clamping members have been wedged tightly and securely upon the flanged ends 2 of the spring spokes 1 whereby they are firmly held in position. I then screw the dust cap 18 (which is provided with smaller threads than the clutch 13) upon the end of the hub thereby securely locking said clutch in fixed position upon said hub.

It will thus be seen that I have provided a neat, convenient, and efficient means for securing the inner ends of the springs in fixed relation to the hub without the use of bolts, thus preventing the loosening of bolts and consequently avoiding rattling or damage which would be caused thereby, while at the same time providing a simpler, speedier and cheaper manner of assembling the wheel, as the driving home of the clutch fastens all of the spring spokes onto the hub simultaneously. This also provides a quicker and less laborious way of tightening the wheel after a period of use.

An important advantage of my present construction is in the more extended contact of the spring spokes with the felly, by which a more secure union of the parts is obtained, by means of nuts and bolts which bind the spring spokes directly to the felly. This also provides for extended or elongated flanges formed integral on the edges of the spring spokes to engage the surface of the wood felly, and prevent any damage to the spring spokes due to side thrusts, and also preventing any disarrangement of the spring spokes with relation to the rim of the wheel from any cause such as when hitting curbs or otherwise when the machine is skidding.

Extending each spring spoke over a considerable distance of the surface of the wood felly, prevents the outer end of the spring spoke from settling into the wood, which would result in weakening the wheel at that point, and throwing it out of center upon one side, which would loosen the bolts and also prevents pressure upon one point of such felly which would deform and flatten the felly under such pressure.

The wheel may be provided with any form of tread surface desired, such as a solid rubber tire 19, as shown, the same being secured thereon by any suitable means such as the holding member 20.

It will be noted that my improved hub is well adapted for use in connection with ball bearings, as shown, or any of the other forms in use, such as roller bearings.

It will be readily seen that a wheel constructed in accordance with my invention is extremely simple in its construction, neat in its appearance and convenient to assemble; also that the spring spokes are so formed as to provide an almost continuous bearing surface of the spring spokes with the rim and hub respectively.

The elongated rim-ends of the spring spokes are placed a sufficient distance from each other to allow for some expansion or elongation in length under heavy tension, without coming in contact with each other, thereby allowing the freest action under the heaviest loads and jars without any liability of these parts striking each other and making a noise or causing wear.

It will be observed that the number of bolts and nuts necessary to secure the parts together has been reduced to a minimum.

My invention is capable of some modification without departure from its spirit or scope.

I claim:

1. A wheel of the nature disclosed combining a hub having a polygonal periphery providing at one end an overhanging flange, a spoke-spring radiating from said hub and having an end-flange extending circumferentially on a facet of the periphery of said hub at one side of said overhanging flange, a block surmounting said end-flange and having one end engaging said overhanging flange, and means for forcing said block toward said flange, whereby it may be wedged radially inward upon said end-flange to clamp the same upon the periphery of said hub.

2. A wheel of the nature disclosed combining a hub having a polygonal periphery providing at one end an overhanging flange. a spoke spring radiating from said hub and having an end flange extending circumferentially on a facet of the periphery of said hub at one side of said overhanging flange, a block surmounting said end-flange and having one end engaging said overhanging flange, and means for forcing said block toward said flange, whereby it may be wedged radially inward upon said end-flange to clamp the same upon the periphery of said hub; said block adapted to abut the adjacent radially extending portion of said spring and support the same against torsional strains.

3. A wheel of the nature disclosed combining a hub having a polygonal periphery providing at one end an overhanging flange, a spoke spring radiating from said hub and having an end flange extending circumferentially on a facet of the periphery of said hub at one side of said overhanging flange, a block surmounting said end flange and having one end engaging said overhanging flange, and a collar on said hub having an overhanging flange adapted to engage the other end of said block and force said block toward said flange, whereby it may be wedged radially inward upon said end-flange to clamp the same upon the periphery of said hub.

4. A wheel comprising a hub, having a polygonal periphery providing a tapering flange near one end, flanged spring spokes adapted to bear against facets of said hub, a rim, means for securing said spokes to said rim, clamping members each having tapering ends, a clutch having a tapering edge adapted to engage one tapering end of each clamping member and force the other tapering end of each clamping member beneath said tapering flange whereby said spokes are securely clamped to said hub, and means for locking said clutch in position, substantially as set forth and for the purposes specified.

5. A wheel comprising a hub, a rim, a flat spring steel triangularly shaped spoke having its middle portion curved outwardly to conform to the inner surface of the rim of said wheel and having flanges adapted to engage the sides of said rim, means for directly connecting and securing said middle portion to said rim, the two remaining portions of said spoke being curved inwardly and adapted to meet and rest upon each other a portion of their length and each having a flange extending away from each other in opposite directions at an angle to said spoke and adapted to conform to and rest upon the hub, a tapering flange upon said hub, wedge clamping members adapted to conform to the flanged ends of said spring spoke and engage said flanges upon the hub, a clutch having a tapering edge adapted to engage the other end of each wedge shaped clamping member whereby when said clutch is moved in proper position upon said hub the flanges of said spring spokes will be clamped tightly upon said hub, and means whereby the clutch is securely locked, substantially as set forth and for the purposes specified.

6. A wheel comprising a rim, a hub, a series of flat spring spokes each reversely curved to meet itself a portion of its length and spread apart a portion of its length and curved between the hub, and rim ends of said spoke, flanges on the hub end of each spoke, wedge clamping members tapered at each end adapted to rest upon and project beyond said flanges, said hub having an annular tapering flange on its inner end, a fiber collar on said hub upon which said flanges abut and bear, and a clutch having a tapering edge adapted to engage the tapering or wedge shaped end of said wedge clamping members whereby they are firmly clamped upon said spoke flanges, substantially as set forth.

7. A wheel of the nature disclosed combining a hub-member having a polygonal periphery providing at one end an inclined overhanging peripheral flange; a series of blocks closely spaced peripherally around the hub of said wheel and each at one end engaging said overhanging flange, a series of flat spoke springs radiating outwardly from between said blocks, and means for forcing said blocks toward said flange whereby they may be forced closer together to clamp the spoke springs back-to-back therebetween.

8. A wheel of the nature disclosed combining a hub-member, a spaced series of flat spoke springs arranged edgewise to the plane of the wheel and radiating back-to-back from said hub-member, a series of blocks alternately in close relation with said radial springs and having their side walls conforming to an intimate contact with said springs, and adjustable means for engaging the extremities of said blocks and adapted adjustably to close said blocks toward the center of the wheel whereby tangential clamping pressures may thereby be exerted on the back-to-back springs between each pair of blocks taken in succession.

9. A resilient wheel of the nature disclosed combining a rigid hub providing at one end an overhanging peripheral flange, a rim at a relatively great distance therefrom, an equispaced plurality of radially elongated resilient spokes of sheet metal arranged edgewise to the plane of the wheel and extending from said rigid hub to said rim, said spokes at the hub being formed of a series of right and left spring portions arranged in pairs and contacting back-to-back and providing flange-like feet extending in opposite directions on the periphery of said hub, said back-to-back spring portions progressively diverging from one another, a clamping block between each successive pair of back-to-back spring portions and resting on the said oppositely directed feet, each of said clamping blocks having one end engaging said flange, and means for engaging the other ends of said blocks whereby they may be forced closer together to clamp said spoke springs to said hub.

10. A resilient wheel of the nature disclosed combining a rigid hub providing at one end an overhanging peripheral flange, a rim at a relatively great distance therefrom, an equispaced plurality of radially elongated resilient spokes of sheet metal arranged edgewise to the plane of the wheel and extending from said rigid hub to said rim, said spokes at the hub being formed of a series of right and left spring portions arranged in pairs and contacting back-to-back and providing flange-like feet extending in opposite directions on the periphery of said hub, a clamping-block between each successive pair of back-to-back spring portions resting on the said oppositely directed feet, each of said clamping blocks having a beveled end engaging said flange, and wedge means for engaging the other ends of said blocks whereby they may be forced closer together to clamp said spoke springs to said hub.

11. A resilient wheel of the nature disclosed combining a rigid hub providing at one end an overhanging peripheral flange, a rim at a relatively great distance therefrom, an equispaced plurality of radially elongated resilient spokes of sheet metal arranged edgewise to the plane of the wheel and extending from said rigid hub to said rim, said spokes at the hub being formed of a series of right and left spring portions arranged in pairs and contacting back-to-back and providing flange-like feet extending in opposite directions on the periphery of said hub, said back-to-back spring portions progressively diverging from one another, a clamping-block between each successive pair of back-to-back spring portions and resting on the said oppositely directed feet, each of said clamping-blocks having one end engaging said flange, and adjustable means for engaging the other ends of said blocks and adapted adjustably to close said blocks toward the center of the wheel whereby tangential clamping pressures may be exerted on the back-to-back springs between each pair of blocks taken in succession.

12. A resilient wheel of the nature disclosed combining a rigid hub providing at one end an overhanging peripheral flange, a rim at a relatively great distance therefrom, an equispaced plurality of radially elongated resilient spokes of sheet metal arranged edgewise to the plane of the wheel and extending from said rigid hub to said rim, said spokes at the hub being formed of a series of right and left spring portions arranged in pairs and contacting back-to-back and providing flange-like feet extending in opposite directions on the periphery of said hub, said spring portions progressively diverging from one another and approaching their neighbors at the rim adjacent the radial center line between the adjacent pairs of back-to-back portions, a clamping-block between each successive adjacent pair of back-to-back spring portions resting on the said oppositely directed feet, each of said clamping-blocks having its ends beveled and each having one end engaging said flange, and a member having an under-beveled flange adapted to engage the other end of one of said blocks whereby it may be forced closer to said hub.

JOHN E. STRIETELMEIER.

Witnesses:
JAMES N. RAMSEY,
H. J. YOUNG.

Copies of this patent may be obtained for five cents each, by addressing the "Commissioner of Patents, Washington, D. C."